No. 621,955. Patented Mar. 28, 1899.
W. E. ANDERSON.
MEANS FOR BINDING CYLINDRICAL COTTON BALES AND TIE AND COVERING THEREFOR.
(Application filed June 21, 1895. Renewed Sept. 28, 1898.)
(No Model.) 3 Sheets—Sheet 1.
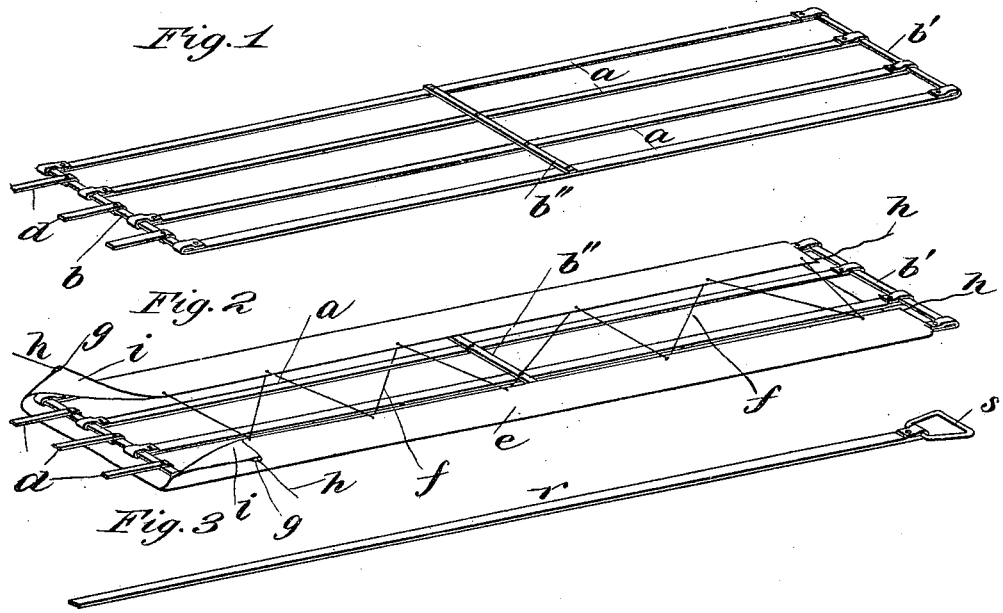
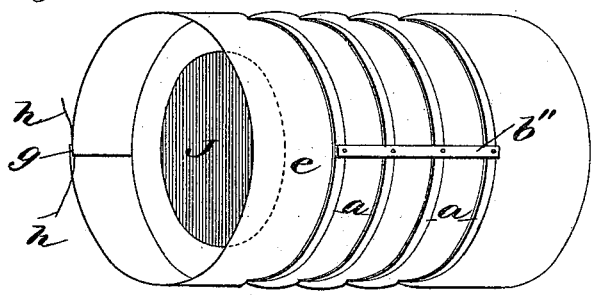
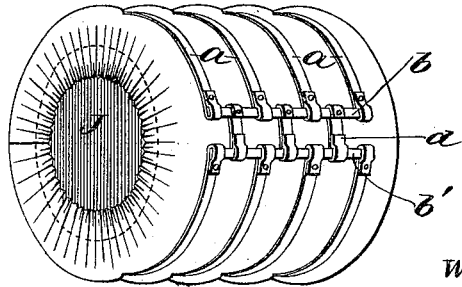
Witnesses.
J. F. Coleman
Archie G. Rees
Inventor:
William E. Anderson
by Frank L. Dyer
Atty.

No. 621,955. Patented Mar. 28, 1899.
W. E. ANDERSON.
MEANS FOR BINDING CYLINDRICAL COTTON BALES AND TIE AND COVERING THEREFOR
(Application filed June 21, 1895. Renewed Sept. 28, 1898.)
(No Model.) 3 Sheets—Sheet 2.
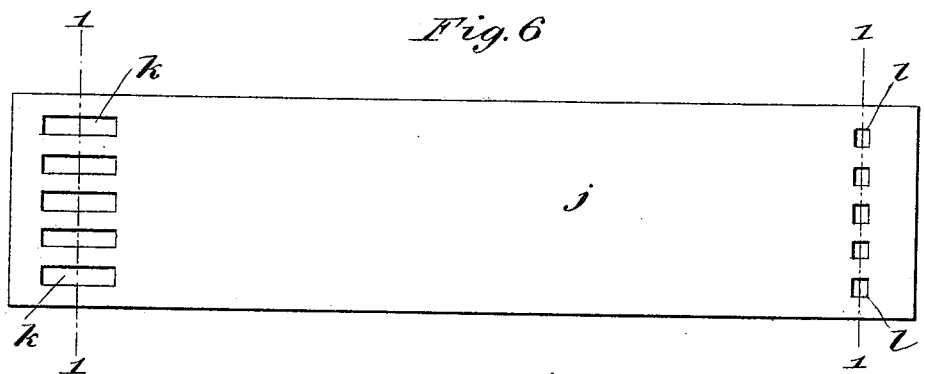
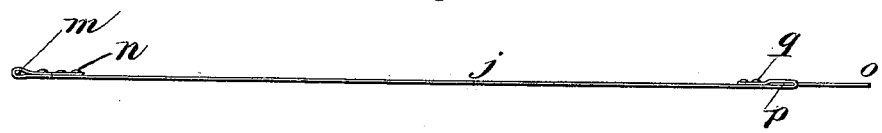
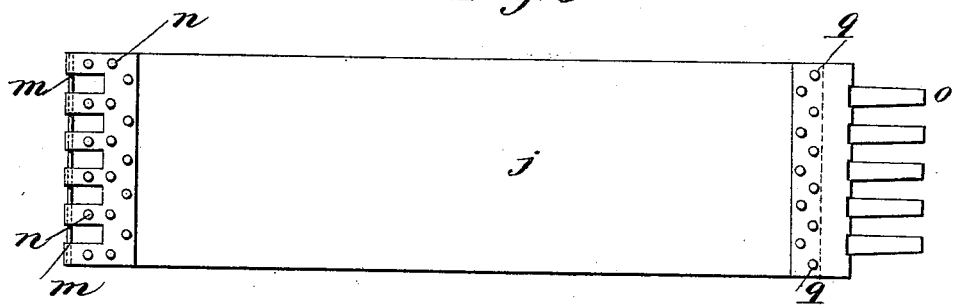
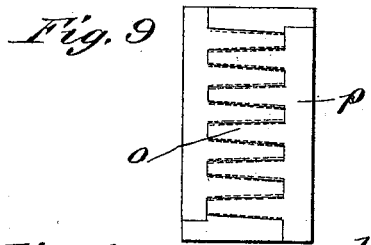
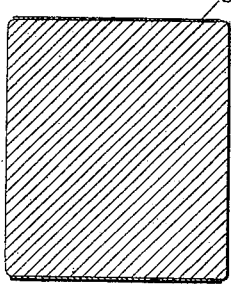
Witnesses.
J. F. Coleman
Archie G. Reen
Inventor
William E. Anderson
by Francis L. Dyer
Atty.

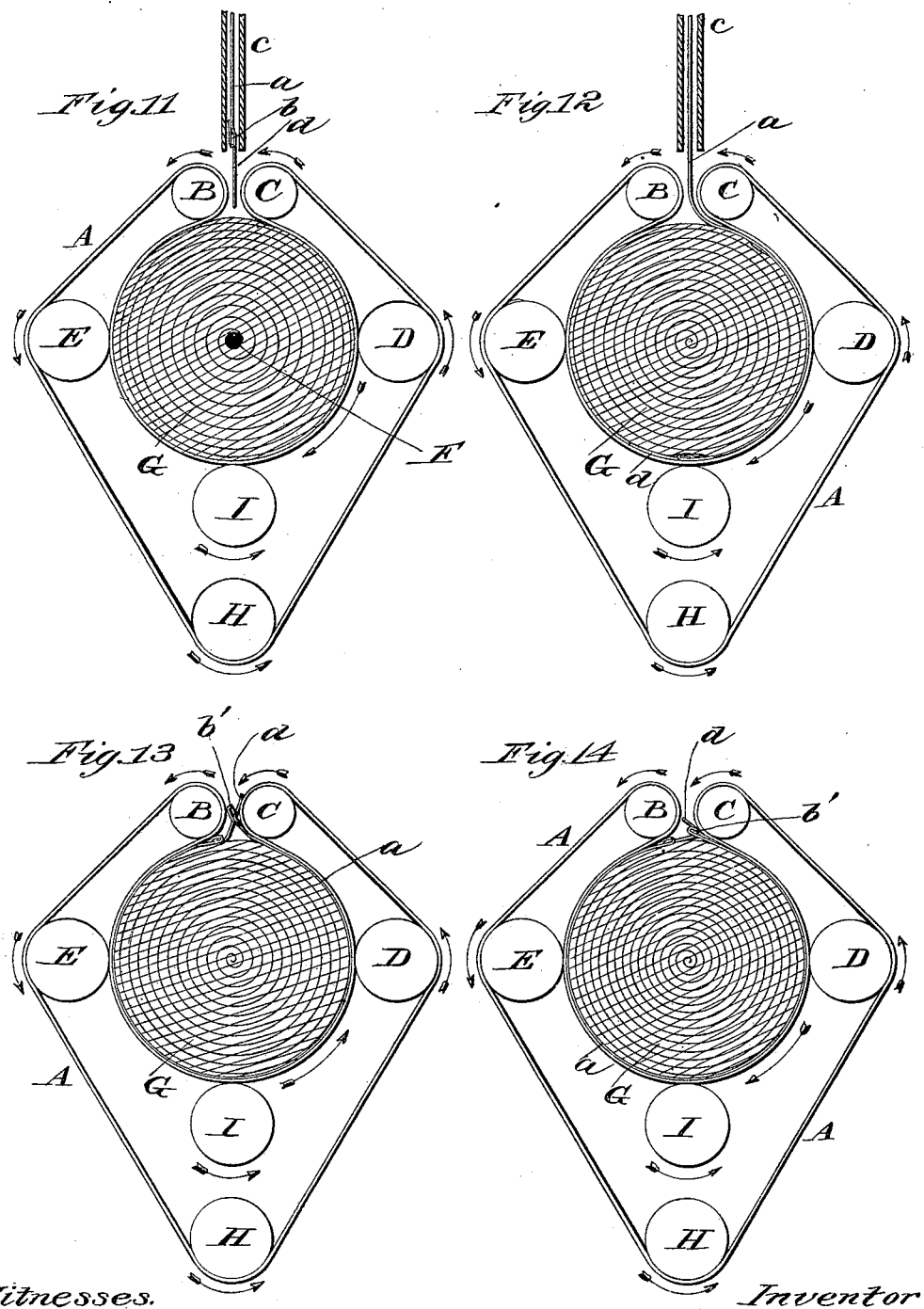

UNITED STATES PATENT OFFICE.

WILLIAM EMMET ANDERSON, OF WASHINGTON, DISTRICT OF COLUMBIA, ASSIGNOR, BY MESNE ASSIGNMENTS, TO THE AMERICAN COTTON COMPANY, OF NEW YORK, N. Y.

MEANS FOR BINDING CYLINDRICAL COTTON-BALES AND TIE AND COVERING THEREFOR.

SPECIFICATION forming part of Letters Patent No. 621,955, dated March 28, 1899.

Application filed June 21, 1895. Renewed September 28, 1898. Serial No. 692,141. (No model.)

*To all whom it may concern:*

Be it known that I, WILLIAM EMMET ANDERSON, a citizen of the United States, residing at Washington, in the District of Columbia, have invented a new and useful Means for Binding Cylindrical Cotton-Bales and Improved Ties and Covering Therefor, of which the following is a specification.

My invention relates to various new and useful improvements in means for binding cylindrical cotton-bales and in ties and covering therefor.

The objects of my invention are, first, to provide means for automatically covering cylindrical cotton-bales while the bale is subjected to the pressure of the press and while the press is in constant operation, whereby the cost and time required to make said bales will be materially reduced, and, second, to provide a cheap, effective, and durable covering and ties for cylindrical cotton-bales, all as will be more fully described and claimed.

This covering may be of any suitable material. In the present application I shall describe two effective coverings for cylindrical cotton-bales which I have used practically with excellent results. The first is a canvas covering, with which in order to carry out my improved mechanism for applying the same one or more ties or bands are to be used, said ties or bands being preferably continuous. The second is made of very thin sheet metal and is provided at its ends with fastening devices by means of which it may be secured on the bale. It may be said, therefore, that the second covering is a combined covering and ties, since separate ties are not necessary. Separate ties may, however, be used when the sheet metal is not provided with fastening devices at its ends, in which case it may be applied to the bale in substantially the same way as a canvas covering.

A cotton-bale covered with either form of covering or with any equivalent covering applied by the mechanism which I have invented will be practically waterproof, and therefore the cotton will be effectively protected from damage by water, acids, oil, dirt, and other substances which now frequently damage and contaminate cotton put up in ordinary compressed bales.

For a better comprehension of my invention attention is directed to the accompanying drawings, forming a part of this specification, and in which—

Figure 1 is a perspective view of the preferred form of the tying device or bands for the bale when the bale is covered with a canvas or similar covering; Fig. 2, a similar view showing the said tying device or bands with a canvas covering applied thereon, ready to be applied to the bale; Fig. 3, a similar view of a modified construction of bands; Fig. 4, a perspective view of the bale with a canvas cover after it is removed from the machine; Fig. 5, a similar view of the completed bale with a canvas cover; Fig. 6, a plan view of a sheet-metal covering which may be used in lieu of a canvas covering, showing the way in which the sheet is cut before the tying-fingers are secured to the same; Fig. 7, a side elevation of the sheet-metal covering complete, ready to be applied to the bale; Fig. 8, a plan view of the same; Fig. 9, a plan view illustrating the manner of making the tying-fingers when a sheet-metal covering is used; Fig. 10, a longitudinal section of a cotton-bale covered with a sheet-metal covering; and Figs. 11, 12, 13, and 14, diagrammatic views illustrating different positions of the parts during the operations of covering and tying the bale.

In all of the above views corresponding parts are designated by similar letters of reference.

In Figs. 11, 12, 13, and 14 I illustrate a convenient form of press in which to compress the cotton into a cylindrical bale, said press consisting, essentially, of a belt A, carried by rollers B, C, D, and E, and being driven by one or all of said rollers, or by other means, in the direction of the arrow. This belt A passes between the rollers B and C, as shown, and forms a loop or bight which partially encircles a spindle or core F on which the bale G is being formed, said belt being in constant contact with the bale during all stages of its formation.

H is a tension-roller for applying pressure upon the bale at all times, and I is an idler for receiving and sustaining the weight of the bale when it has reached its maximum size.

The rollers B, C, D, E, and I, are arranged so that when the bale has reached its maximum diameter the loop or bight will be sufficiently distended to allow the belt surrounding the bale to be pressed upon by all of these rollers.

Although I prefer to make the cotton-bale in a press wherein pressure is imposed upon the bale by means of a belt such as I have described, yet I desire to have it understood that any other press by which said bale can be produced and in which my invention can be carried out may be employed without departing from the essential spirit of my invention.

In operating a press of this character the spindle or core F is first inserted in position in the press, and the tension-roller H is allowed to descend to its lowest limit of movement, whereby the loop or bight of the belt will be contracted around the spindle or core F. The belt A is now driven in any suitable way in the direction of the arrow, and the friction between the loop or bight thereof and the spindle or core F will cause the latter to revolve. This latter action is not necessary, and when the spindle or core is polished the belt will simply slip thereon without revolving the same at first. A continuous sheet or bat of cotton of the proper thickness coming from the condenser in the usual way, and which may have been first compressed between pressure-rollers, if desired, is now inserted between the rollers B and C and is allowed to wind convolutionally around the spindle F by the movement of the belt, being subjected at all times to pressure from said belt imposed by the pressure-roller H. This operation is continued until a sufficient amount of cotton has accumulated by being thus wound spirally on the spindle or core F to cause the belt to come in contact with the rollers B, C, D, E, and I, by which the bale will be supported. The spindle or core F is now withdrawn endwise from the bale, and the latter is ready to be wrapped and tied. This I prefer to do while the bale is still revolving in the press and cotton is being wedged on the same by the compressing action of the encircling rollers.

Reference being now had to Figs. 1 and 2, the construction and arrangement of a canvas covering and ties therefor will be understood. The bands or ties which I prefer to use when a canvas covering is employed, and which are shown in Fig. 1, consist of the parallel bands $a\ a\ a$, preferably four in number, cross-bands $b\ b'$ at each end thereof, connecting said parallel bands $a$ and secured to the same, a second cross-band $b''$ at or near the center of the bands $a\ a$, extending parallel to the cross-bands $b\ b'$, and the short tying-fingers $d\ d$, secured to the cross-band $b$ and extending parallel with the bands $a\ a\ a$ midway between the same. The distance between the cross-bands $b$ and $b'$ should be approximately equal to the circumference of the completed bale, so that when the bands are wrapped around the bale said cross-bands $b\ b'$ will be adjacent to and parallel with each other. The manner of securing a canvas covering for the bale to said bands, whereby both the covering and bands may be passed around the bale simultaneously, is shown in Fig. 2. A piece of suitable material $e$, preferably canvas, of a general rectangular shape, is passed around the bands, as shown, and temporarily secured by the lacing $f$ or in any other suitable way. The edges $g$ of said covering $e$ are hemmed over, and each is provided with a puckering-string $h$ therein. This covering is so arranged on the bands as to leave the cross-band $b'$ outside thereof and also the ends of the tying-fingers $d$.

In order that the corners of the covering adjacent to the tying-fingers $d$ may not become entangled with said fingers, the said corners are turned over and temporarily secured, as at $i$.

Instead of applying a canvas covering to the bale and securing the same by means of separate bands or ties such as I have just described a sheet-metal covering may be employed, whereby separate bands or ties may be dispensed with.

Referring to Figs. 6, 7, 8, and 9, I have illustrated a convenient construction of sheet-metal covering which also serves as an effective binding means for the completed bale. A rectangular piece $j$ of very thin sheet metal, such as sheet-iron, is formed of a width slightly less than the length of the completed bale and of a length somewhat greater—say from six inches to a foot—than the circumference of the bale. In this sheet $j$ a number of parallel slots $k$ are cut near one end thereof, and near the other end a corresponding number of shorter and somewhat narrower slots $l$ are formed. The sheet is now bent over on the dotted line 1 1 in Fig. 6, and a bar $m$ of steel or iron is inserted in place, after which the end of the plate is riveted to the body of the plate $j$ by rivets $n$. The bar $m$ ordinarily need not be further secured, though, if desired, it may be soldered or otherwise fastened in place. Through the slots $l$ a number of tying-fingers $o$ (corresponding to the fingers $d\ d$) are inserted, being supported on an integral connecting-piece $p$. The other end of the plate $j$ is now bent over upon the connecting-piece $p$ and riveted to the body of the plate in the rear of said connecting-piece or directly through the same by means of rivets $q$. The tying-fingers $o$, which are preferably of considerably heavier metal than the plate $j$, may be conveniently formed of a single rectangular plate, as shown in Fig. 9, whereby two sets of such fingers will be produced out of such plate, after which the fingers may be trimmed down slightly, as indicated in dotted lines, in order that said fingers may be automatically inserted within the slots $k$ behind the bar or rod $m$ when the covering is passed around the bale.

In describing the manner of covering the bale I will refer particularly to the application thereto of a canvas covering and separate bands or ties, from which the applicability of a sheet-metal covering to the same will be readily understood.

As a matter of fact a sheet-metal covering such as above described in a broad sense differs from the canvas covering only in that it is provided with integral ties instead of with separate ties. So far as the carrying out of my present invention is concerned it is immaterial whether the ties are a part of the covering or not, as will be understood, and in fact the invention can be effectively carried out without applying a covering to the bale simultaneously with the ties, it being possible to secure the cover to the bale over the ties and after the ties have been applied by my improved means, or instead a covering may be first allowed to wrap around the bale, after which the ties may be separately applied.

In order to apply the covering and bands to the completed bale, an ordinary chute $c$ is made use of, within which the bands and covering are inserted, as shown in Figs. 11 and 12.

Having reference to the covering of a bale with a canvas covering and separate ties, I proceed as follows: After a sufficient amount of cotton has accumulated upon the bale the covering and bands are allowed to pass from the chute $c$ around the bale by the movement of the belt A, as shown in Fig. 11, the fingers $d\ d$ being always inserted first. As the covering and bands continue to pass around the bale the fingers $d$ will emerge from under the roller B at the moment the bar $b'$ is approaching the roller C, and said fingers $d\ d$ will be automatically inserted immediately in front of the bar $b'$, as shown in Fig. 13. The bale being caused to continue to rotate, the ends of the fingers $d\ d$, which now extend past the cross-piece $b'$, will be bent over said cross-piece by being rolled beneath the roller C, and the ties will be thus automatically secured and clamped in place. This operation is done under great pressure, as will be understood, and the density of the bale cannot therefore be affected. The rollers B and E are now swung out of the way, and the bale thus formed is allowed to be ejected from the machine, preferably by the tension upon the belt A. The lacing $f$ is now cut, and the portions of the covering $e$ which were folded over the bands $a\ a\ a$ are now brought over the ends of the bale, and the puckering-string $h$ is now drawn up on each side and secured, so that the bale will present the appearance shown in Fig. 5. Before the ends are thus partially covered a disk of waterproof material J, such as waterproof paper or canvas, may be applied to the ends of the bale, so as to effectively protect the same.

When a sheet-metal covering, such as I show in Figs. 6, 7, 8, and 9, is employed, it is applied to the bale in precisely the same way as I have just described, the tying-fingers $o$ being inserted first, the covering being carried around the bale by the movement of the belt, the tying-fingers entering the slots $k$ immediately in front of the bar or rod $m$ and being bent over and clamped upon said bar or rod by the pressure-roller C. When a sheet-metal covering is used, the ends of the bale may be left entirely open or the ends may be covered in any suitable manner, whereby a very strong, durable, and absolutely fire-proof package will be obtained.

Instead of applying the bands and covering to the bale by a single operation, as explained, when separate bands are used it is evident that the bands may be first applied and secured and that the covering may then be applied in any suitable way, either when the bale is in the press or after it has been removed from the press. It is further evident that the covering may be first applied to the bale in the press by winding a layer of canvas one or more times around the bale and that subsequently the bands or ties may be put on over the covering, as explained.

While I prefer to make use of separate bands or ties such as I have described when a canvas covering is used, as such bands or ties can be easily and cheaply made of sheet metal and being flat tend to pass around the bale without danger of being deflected out of their proper paths, yet such bands or ties can be made of wire or similar material worked into the proper form, or one or more bands or ties such as I have shown in Fig. 3 may be made use of. This band or tie consists, essentially, of a flat metal strip $r$ of sufficient length to extend around the bale and be lapped over, and a stirrup-shaped head $s$, which may be made integral with the strip $r$ or may be a separate piece riveted to the same. This band or tie is applied to the bale in the same manner as I have described, the end of the strip passing around the bale and entering the head $s$, being then bent over on said head by being rolled beneath the roller C. Any convenient number of these ties or bands may be employed, and the covering may be secured to the bale simultaneously with the applying of the same, as before, or after such bands or ties are applied.

Having now described my invention, what I claim as new, and desire to secure by Letters Patent, is as follows:

1. For binding cylindrical cotton-bales, the combination of means for revolving the bale and simultaneously subjecting the same to pressure, and a tie or ties provided with ends capable of engagement and fed to the revolving bale and to the means for effecting its revolution and pressure, whereby said tie or ties will be wound around the bale, causing their ends to be engaged while the bale is revolving and under pressure, substantially as described.

2. For binding cylindrical cotton-bales, the combination of means for revolving the bale and simultaneously subjecting the same to pressure, and a tie or ties provided with ends capable of engagement and fed to the revolving bale and to the means for revolving and pressing the bale, whereby said tie or ties will be wound around the bale and their ends will be engaged, and means for securing said engaged ends together in such engagement while the bale is revolving and under pressure, substantially as set forth.

3. For binding cylindrical cotton-bales, the combination of means for revolving the bale and simultaneously subjecting the same to pressure, a tie having an eye at one end and a projecting finger at the other, and fed finger end first to the revolving bale and to the means for revolving and pressing the bale, whereby said tie will be wound around the bale and said finger automatically engaged within the eye by the revolution of the bale, and means for bending the finger over upon the eye as the bale revolves, substantially as described.

4. For binding cylindrical cotton-bales while still in a rotary press and under pressure, the combination of a tie or ties having ends capable of engagement, fed to the revolving bale and to the means for revolving and pressing the bale, whereby said tie or ties will be wound around the bale and the ends of said tie or ties will be engaged at a point on the bale that is not subjected to pressure, and a pressure device of the press arranged in the path of the movement of the engaged ends to secure them in that engagement while the bale is revolving and under pressure, substantially as described.

5. An improvement in bands or ties for cylindrical cotton-bales, comprising bands $a, a$, arranged parallel with each other, a cross-piece for securing the rear ends of said bands together, and tying-fingers at the front ends thereof bent over upon said cross-piece and thus secured, substantially as set forth.

6. An improvement in covering and bands or ties for cylindrical cotton-bales in combination, the bands $a, a$, arranged parallel with each other, a cross-piece for securing the rear ends of said bands together, and tying-fingers at the front ends thereof bent over said cross-piece and secured, and a covering of canvas temporarily secured to said bands $a, a$, and adapted to be simultaneously applied therewith to a bale, substantially as set forth.

7. An improvement in bands or ties for cylindrical cotton-bales, comprising bands $a, a$, arranged parallel with each other, cross-bands $b, b'$, at each end thereof, and the tying-fingers $d, d$, secured to said cross-band $b$ between the bands $a, a$, substantially as set forth.

In testimony whereof I affix my signature in presence of two witnesses.

WILLIAM EMMET ANDERSON.

Witnesses:
FRANK L. DYER,
ARCHIE G. REESE.